(12) United States Patent
Kim et al.

(10) Patent No.: US 8,421,950 B2
(45) Date of Patent: Apr. 16, 2013

(54) LIQUID CRYSTAL DISPLAY DEVICE

(75) Inventors: Hyunok Kim, Kyungbuk (KR);
Byungik Yoo, Busan (KR)

(73) Assignee: LG Display Co., Ltd., Seoul (KR)

( * ) Notice: Subject to any disclaimer, the term of this patent is extended or adjusted under 35 U.S.C. 154(b) by 220 days.

(21) Appl. No.: 12/820,039

(22) Filed: Jun. 21, 2010

(65) Prior Publication Data

US 2011/0141391 A1    Jun. 16, 2011

(30) Foreign Application Priority Data

Dec. 14, 2009  (KR) .................... 10-2009-0124049

(51) Int. Cl.
*G02F 2001/133308* (2006.01)
(52) U.S. Cl.
USPC ............... 349/58; 361/679.01; 361/679.02; 362/632; 362/633; 362/634
(58) Field of Classification Search ........................ None
See application file for complete search history.

(56) References Cited

U.S. PATENT DOCUMENTS

| 2003/0118805 A1* | 6/2003 | Kretman et al. ........... 428/304.4 |
| 2007/0085943 A1* | 4/2007 | Kang et al. ..................... 349/65 |
| 2008/0143918 A1* | 6/2008 | Kim .................................. 349/58 |

FOREIGN PATENT DOCUMENTS

KR    10-2004-0077176 A    9/2004

* cited by examiner

*Primary Examiner* — Thanh-Nhan P Nguyen
(74) *Attorney, Agent, or Firm* — Birch, Steward, Kolasch & Birch, LLP

(57) ABSTRACT

The present disclosure relates to the present disclosure relates to a liquid crystal display device adapting a guide panel having a reinforced structure. A liquid crystal display panel according to the present disclosure comprises: a liquid crystal display panel; a light guide plate disposed under the liquid crystal display panel; an LED light source disposed one side of the light guide plate; a cover bottom housing the LED light source and the light guide plate; and a guide panel supporting the liquid crystal display panel, and wraping the LED light source and the light guide plate at outside, wherein the guide panel has an outer vertical surface and a support rib apart from the outer vertical surface inward to form a space for holding a vertical surface of the cover bottom. With simple structure on the guide panel, the reliability of the liquid crystal display panel is enhanced remarkably.

4 Claims, 3 Drawing Sheets

LIQUID CRYSTAL DISPLAY DEVICE

This application claims the benefit of Korea Patent Application No. 10-2009-0124049 filed on Dec. 14, 2009, which is incorporated herein by reference for all purposes as if fully set forth herein.

BACKGROUND OF THE INVENTION

1. Field of the Invention

The present disclosure relates to a liquid crystal display device (hereinafter, LCD) having an edge type backlight unit adopting a light emitting diode (hereinafter LED) as a light source. Especially, the present disclosure relates to an LCD adapting a guide panel having a reinforced structure.

2. Discussion of the Related Art

Nowadays, due to the characteristics of light weight, slim thickness, low consumption electric power, the liquid crystal display device (or, LCD) is widely applied more and more. The LCD is applied to the portable computer such as note book PC, the official automation devices, the audio/video devices and so on. The most used LCD shows the picture data by modulating the luminescence of the light incident from the backlight unit by controlling the electric field applied to the liquid crystal layer.

As the liquid crystal display device is not self-luminescent element, the liquid crystal display device requires a backlight unit for irradiating light to the liquid crystal display panel. There are two kinds of the backlight unit for LCD, one is the direct type backlight unit and the other is the edge type backlight system. For the edge type backlight unit, light source is equipped at the circumferences of the transparent light guide plate. The light is radiated from the light source to the side surface of the light guide panel, and is refracted and/or reflected to the front side on which the LCD panel is disposed. On the other hands, for the direct type backlight unit, a plurality of light sources are disposed under the back side of the LCD panel so that the light is directly radiated from the light source to the overall surface of the LCD panel.

Recently, for the light source of the backlight unit, a light emitting diode (or, LED) is mainly used. Especially, mostly used is the edge type backlight unit in which one side of the light guide disposed under the flat display panel such as liquid crystal display panel.

FIG. 1 is a perspective view illustrating a structure of the liquid crystal display panel according to the related art. Referring to FIG. 1, the liquid crystal display device comprises a liquid crystal display panel 12, and an edge type backlight unit disposed under the liquid crystal display panel 12.

The liquid crystal display panel 12 comprises an upper substrate, a lower substrate, and liquid crystal cells between the upper and lower substrates. The upper substrate of the liquid crystal display panel comprises color filters (not shown), black matrixes (not shown) and so on. The lower substrate of the liquid crystal display panel comprises signal lines such as data lines and gate lines crossing each other, and thin film transistors (TFTs) at the crossing corner of the signal lines. Responding to the scan signal through the gate line, the TFT supplies the data signal from the data line to the liquid crystal cells. At the pixel area defined by the data line and gate line, a pixel electrode is formed. Furthermore, a common electrode facing with the pixel electrode is also formed in the pixel area. For the vertical electric field type liquid crystal display panel such as a TN (Twisted Nematic) mode or a VA (Vertical Alignment) mode, the common electrode is formed at the upper substrate 104. Contrary, for the horizontal electric field type liquid crystal display panel such as IPS (In Plane Switching) mode or a FFS (Fringe Field Switching) mode, the common electrode is formed at the lower substrate 102 with the pixel electrode.

The edge type backlight unit includes a light source 15, a light guide plate 16, and a plurality of optical sheets 14. The light radiated from the light source 15 is diffused in the light guide plate 16 and refracted to the upper surface of the light guide plate 16 where the liquid crystal display panel 12 is located. Through the optical sheets 14, the light from the light guide plate 16 is evenly dispersed all over the surface of the liquid crystal display panel 12. The light source 15 is disposed at least one side of the light guide plate 16 to irradiate the light to the side surface of the light guide plate 16. The light guide plate 16 changes the light path incident from the side surface to the substantially perpendicular direction, i.e, to the upper side of the light guide plate 16. The optical sheets 14 comprise one or more prism sheets and one or more diffusion sheet. The optical sheets 14 can further include a dual brightness enhancement film (DBEF) for enhancing the brightness of the backlight.

A cover bottom 17 is disposed with housing the light source 15 and light guide plate 16 from bottom side. The cover bottom 17 is made of a material having high thermal conductivity for radiating the heat from the light source 15 to outside of the cover bottom 17 easily and high strength for preventing the elements therein. For example, the cover bottom 17 can be made of Aluminum (Al), Aluminum Nitride (AlN), Electrolytic Galvanized Iron (EGI), Stainless Steel (SUS), Aluminum-Zinc Alloy Coated steel sheet (i.e, Galvalume), Aluminum coated steel sheet (i.e, ALCOSTA), or Tin coated plate (i.e, SPTE (Steel Plate Tin Electric), SPTH (Steel Plate Tin Hot-dip) or SPTFS (Steel Plate Tin Free Steel)). Furthermore, ultra high thermal conductive materials can be coated on the surface of the plate for the cover bottom 17.

A guide panel 13 and a top case 11 are assembled with surrounding the circumferences of the liquid crystal display panel 12. As a molded frame made of the fiber glass reinforced plastic, the guide panel 13 wraps the circumferences of the upper surface and the 4 sides of the liquid crystal display panel 12 and the side surfaces of the backlight unit. The guide panel 13 supports the liquid crystal display panel 12, and evenly maintains the gap between the liquid crystal display panel 12 and the optical sheets 14. The top case 11 made of coated metal plate such as Electrolytic Galvanized Iron (EGI) covers the upper and side surfaces of the guide panel 13. The top case 11 is fixed at the goude panel 13 or the bottom cover 17 with hooks or screws.

In the liquid crystal display device, it is important to have strength enough to protect most of all elements including LCD panel and other parts from external vibrations and impacts. Especially, required is the backlight unit having a structure or means for protecting the liquid crystal display panel from vibrations or external impacts, as the liquid crystal display panel is getting thinner.

SUMMARY OF THE INVENTION

The purpose of the present disclosure is to suggest a liquid crystal display device having the strength enough to endure from the external impacts or vibrations. Another purpose of the present disclosure is to provide a liquid crystal display device having a strengthened tightening structure between the guide panel and the cover bottom to prevent the liquid crystal display panel from external vibrations and impacts in all directions.

In order to accomplish these purposes, a liquid crystal display panel according to the present disclosure comprises: a liquid crystal display panel; a light guide plate disposed under the liquid crystal display panel; an LED light source disposed one side of the light guide plate; a cover bottom housing the LED light source and the light guide plate; and a guide panel supporting the liquid crystal display panel, and wraping the LED light source and the light guide plate at outside, wherein the guide panel has an outer vertical surface and a support rib apart from the outer vertical surface inward to form a space for holding a vertical surface of the cover bottom.

The liquid crystal display panel according to the present disclosure further comprises: an optical sheet disposed between the liquid crystal display panel and the light guide plate, wherein the guide panel supports the liquid crystal display panel on the optical sheet.

The liquid crystal display panel according to the present disclosure further comprises: a reflection sheet between the light guide plate and the cover bottom.

Furthermore, a liquid crystal display panel according to present disclosure comprises: a guide panel including a body portion having 4 rim frames having a first width; 4 vertical surfaces extruded downward with a first length from outsides of the 4 rim frames; a first support rib apart from at least one vertical surface except a first vertical surface and extended downward with a second length; and a settle portion protruded inward from the 4 rim frames with a second width; a liquid crystal display panel disposed on the settle portion of the guide panel; and a cover bottom including 4 vertical walls and a bottom surface perpendicular to the 4 vertical walls, wherein at least one vertical wall is inserted into a space formed between the support rib and the vertical surface.

The liquid crystal display panel according to the present disclosure further comprises: an LED light source disposed at the first vertical surface; and a second support rib and a third support rib apart from the other two vertical surfaces and extended downward with the second length.

The first length is corresponding to a height of the vertical wall of the cover bottom, and the second length is short than the first length.

The liquid crystal display panel according to the present disclosure has a guide panel having enhanced and reinforced strength structure for supporting the LCD panel and holding the cover bottom with a support rib. The cover bottom is inserted between the outside vertical surface and the support rib when assembling the cover bottom with the guide panel according to the present disclosure. By adapting an additional structure for supporting the circumferential part of the liquid crystal display panel on which a flexible print circuit is attached, the liquid crystal display panel and the connecting part have sufficient strength enough to endure from the external vibrations and impacts. With simple structure on the guide panel, the reliability of the liquid crystal display panel is enhanced remarkably.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
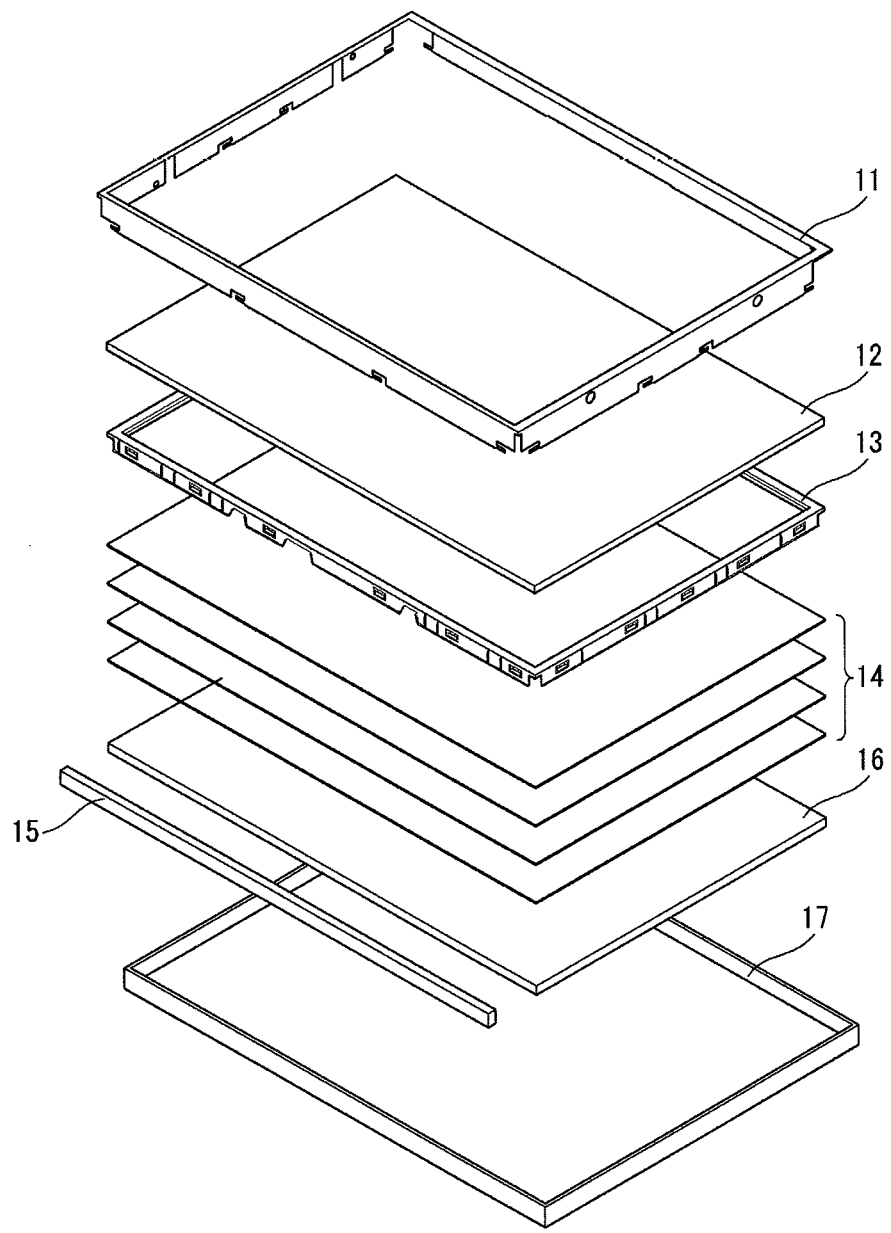
FIG. 1 is a perspective view illustrating a structure of the liquid crystal display panel according to the related art.

Referring to attached FIGS. 2 to 4, the liquid crystal display device according to the preferred embodiment of the present disclosure will be explained in detail. Advantages and features of the present invention and a method of achieving the advantages and the features will be apparent by referring to embodiments described below in detail in connection with the accompanying drawings. Like reference numerals designate like elements throughout the detailed description.

The present disclosure suggests a structure body for the guide panel joining with the cover bottom for an edge type backlight unit to prevent the liquid crystal display panel from being damaged by external vibration and impact. FIG. 2 is a cross-sectional view illustrating a structure of the liquid crystal display device having an edge type backlight unit adapting LEDs as the light source. FIG. 2 shows two parts of the liquid crystal display device; the one part (left part of FIG. 2) is the lower side cross-section having an LED light source, and the other part (right part of FIG. 2) is the upper side cross-section opposite of the lower side cross-section without any light source.

Figure 2:
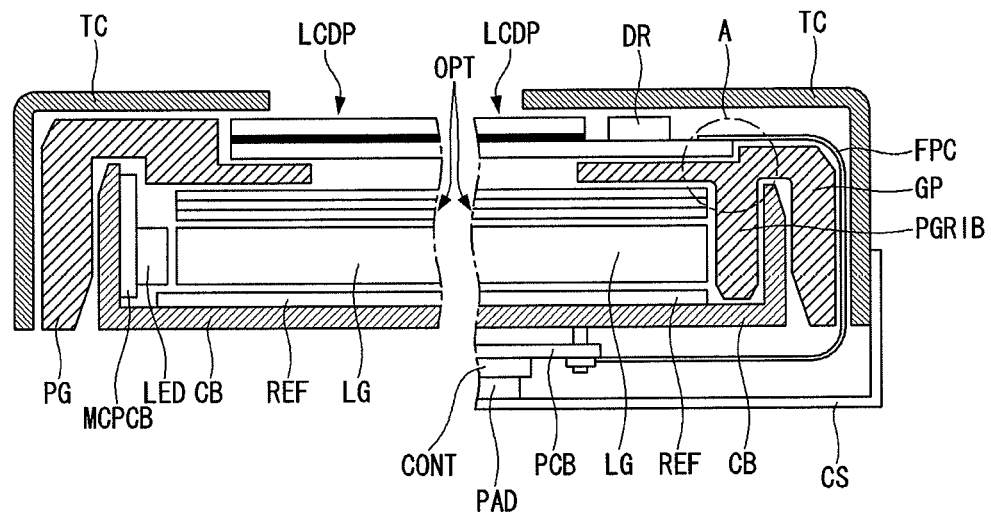
FIG. 2 is a cross-sectional view illustrating a structure of the liquid crystal display panel having an edge type backlight unit adopting LEDs as the light source, according to the present disclosure.

Referring to FIG. 2, the backlight unit according to the present disclosure comprises an LED light source LED, a cover bottom CB, a light guide plate LG, and a plurality of optical sheet OPT. The LED light source LED irradiate the light to the side surface of the light guide plate LG. The LED light source LED is mounted on a light source driver printed circuit board MCPCB disposed on one side wall of the cover bottom CB to face with one side surface of the light guide plate LG. Between the light guide plate LG and the liquid crystal display panel LCDP, a plurality of optical sheet OPT is disposed. The plurality of optical sheet OPT comprise one or more prism sheets and one or more diffusion sheet. The plurality of optical sheets OPT can further include a dual brightness enhancement film (DBEF) for enhancing the brightness of the backlight. The cover bottom CB houses the LED light source LED and the light guide plate LG. A reflection sheet REF is additionally disposed between the cover bottom CB and the light guide plate LG.

The guide panel GP surrounds the side surfaces of the liquid crystal display panel LCDP and the edge type backlight unit. A guide panel GP supports the liquid crystal display panel LCDP, and evenly maintains the gap between the liquid crystal display panel LCDP and the optical sheets OPT. A top case TC wraps the circumferences of the upper side of the liquid crystal display panel LCDP and the side surface of the guide panel GP.

Especially, referring to the right part of FIG. 2, the upper side of the liquid crystal display device has the same structure with the lower side of the liquid crystal display device, except the LED light source. Therefore, there is a vacant space between the side wall of the cover bottom CB and the side surface of light guide plate LG; the vacant space is corresponding to the space where the LED light source LED is installed at the lower side of the liquid crystal display device. With the vacant space, this space cannot support the liquid crystal display panel with strength enough to prevent the panel from the external impacts or vibrations. As a result, the liquid crystal display panel may be cracked or damaged.

In order to solve these problem, the light guide LG and the optical sheet OPT may be formed in large size to fill in the vacant space. However, to do so, the costs for manufacturing the liquid crystal display device may be increased because the light guide plate LG and optical sheets OPT should be prepared specially. Furthermore, the light guide plate LG and the optical sheet OPT do not have strength or structure enough to endure the external impacts or vibrations.

According to the present disclosure, the guide panel PG has a structure including a supporting rib GPRIB at the upper side. For example, the guide panel GP has a support rib GPRIB facing with the outer vertical surface of the guide panel GP with a predetermined gap forward inside direction. Furthermore, the predetermined gap between the outer vertical surface and the support rib GPRIB of the guide panel GP preferably has a space enough to hold the vertical upper side surface of the cover bottom CB. That is, as shown in FIG. 2, the cross-sectional profile of the guide panel GP, at least the upper side opposing to the lower side having the LED light source LED has an "F" shape. Therefore, the cover bottom CB is inserted into the gap between the outer vertical surface and the support rib GPRIB of the guide panel GP.

At the upper surface of the liquid crystal display panel, a driver IC DR for driving the liquid crystal display panel is attached. Through a flexible printed circuit (or "FPC"), the driver IC DR is electrically connected to a timing controller (or "T-CON") CONT mounted on the printed circuit board (or "PCB"). The timing controller CONT is a type of IC generating a lot of heat so that the thermal energy would be radiated to outside through a radiation pad PAD attached on a case shield CS assembled with the top case TC. One end of the flexible printed circuit FPC is electrically connected to the end pad of the liquid crystal display panel LCDP. The flexible printed circuit FPC is extended to the back side of the guide panel GP. The other end of the flexible printed circuit FPC is electrically connected to the pad of the printed circuit board PCB. The top case TC is joined the guide panel GP with surrounding the upper surface circumferences of the liquid crystal display panel LCDP, the flexible printed circuit FPC and the side surface of the guide panel GP.

Figure 3:
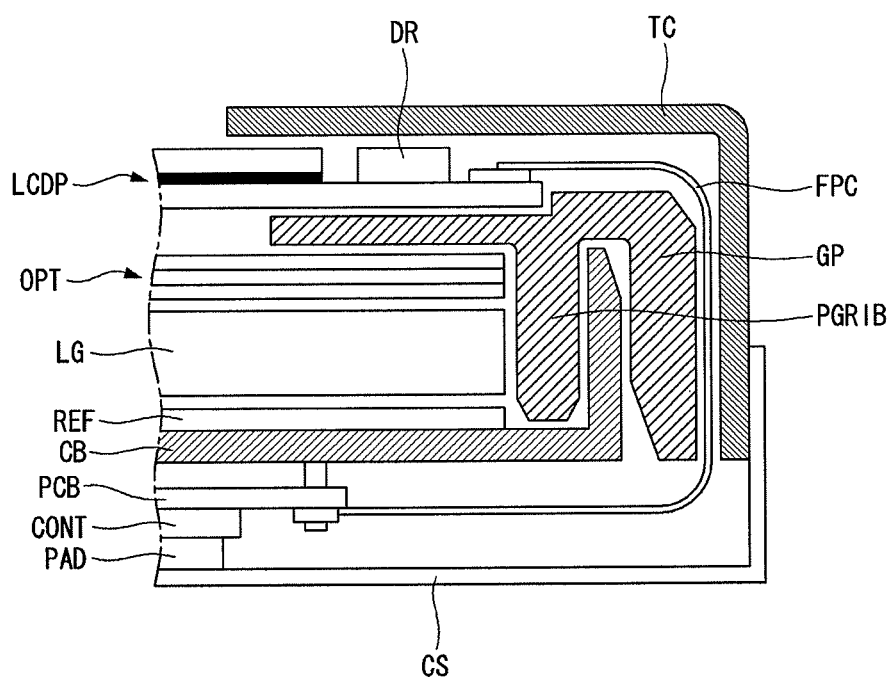
FIG. 3 is an enlarged view illustrating a guide panel having an "F" shaped cross sectional profile.

FIG. 3 is an enlarged view of "A" portion in FIG. 2 illustrating a guide panel having a 'F' shaped cross sectional profile. On the surface under which the support rib GPRIB of the guide panel GP, the connecting part of the flexible printed circuit FPC to the liquid crystal display panel LCDP is disposed. Therefore, even though any impact or vibration is applied, the support rib GPRIB can stand the outer circumferences of the liquid crystal display panel LCDP on which the connecting elements are disposed.

Figure 4:
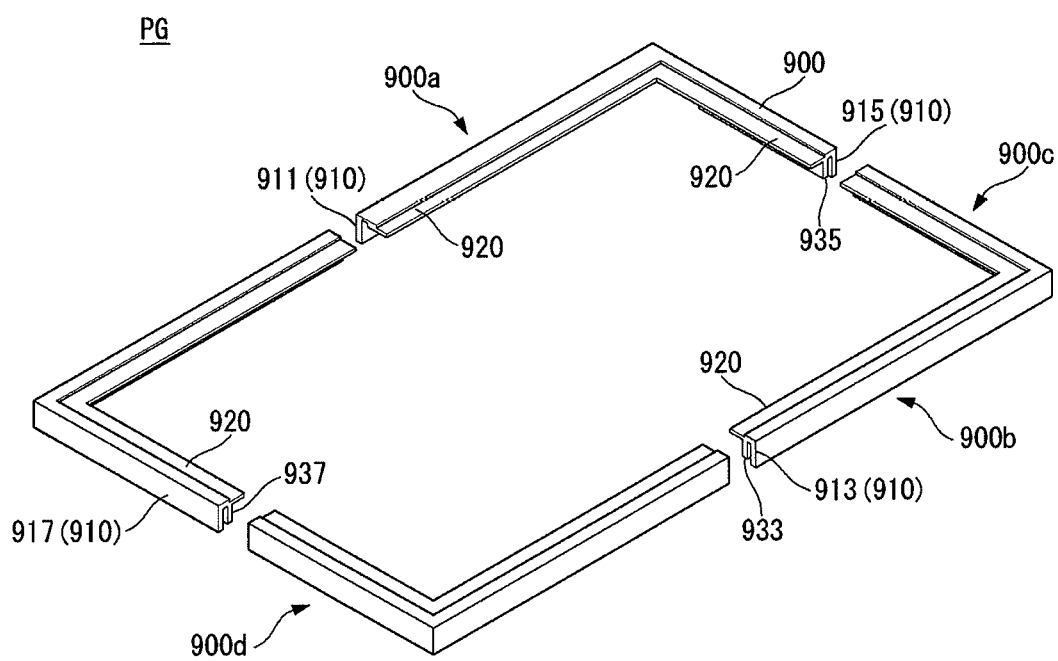
FIG. 4 is a perspective view illustrating a guide panel according to the present disclosure.

FIG. 4 is a perspective view illustrating a guide panel according to the present disclosure. Referring to FIG. 4, the shape and the structure of the guide panel according to the present disclosure will be explained in detail.

The guide panel GP has a rectangular shape corresponding to the shape and size enable to assemble the liquid crystal display panel LCDP. The guide panel GP has a body part 900 having a rectangular rim shape with predetermined width. At the outer circumference of the body part 900, formed a vertical surface 910 extruded downward. The vertical surface 910 preferably has a size to cover the side walls of the cover bottom CB so that, more preferably, the length is corresponding to the height of the cover bottom CB.

At the inner circumferences of the body part 900, a holding portion 920 on which the liquid crystal display panel LCDP is disposed. The settle portion 920 is formed by depressing downward and protruding to the inner space surrounded by the body part 900. The depressed amount of the settle portion 920 has preferably a depth corresponding to the thickness of the liquid crystal display panel LCDP or the thickness of the TFT substrate. The protruding amount of the settle portion 920 has preferably a width corresponding to the outer non-display area of the liquid crystal display panel LCDP.

Furthermore, the body part 900 includes 4 frames; a lower frame 900a, an upper frame 900b, a left frame 900c and a right frame 900d. Therefore, the vertical surface 910 includes 4 vertical surfaces; a lower side vertical surface 911, an upper side vertical surface 913, a left side vertical surface 915 and a right side vertical surface 917. The lower frame 900a of the body portion 900 has only the lower side vertical surface 911. The lower frame 900a is joined the lower side wall of the cover bottom CB where the LED light source LED is mounted. On the contrary, at least one frame among the other 3 frames including the upper frame 900b, the left frame 900c and the right frame 900d, especially the upper frame 900b has a support rib 933 located inward from the upper side vertical surface 913.

The guide panel GP and the cover bottom CB are assembled each other in that the guide panel GP joins downward from upside and the cover bottom CB joins upward from downside. The guide panel GP surrounds the cover bottom CB. Therefore, the length of the upper side vertical surface 913 of the guide panel GP corresponds to the height of the side wall of the cover bottom CB, preferably. In the space between the support rib 933 and the upper side vertical surface 913, the vertical wall of the cover bottom CB is inserted and assembled. Therefore, the space between the support rib 933 and the upper side vertical surface 913 preferably has a gap corresponding to the thickness of the vertical wall of the cover bottom CB. Furthermore, the length of the support rib 933 is preferably shorter than the length of the upper side vertical surface 913. Especially, the length of the support rib 933 is shorter about the thickness of the bottom of the cover bottom CB than the length of the upper side vertical surface 913. In addition, at the left frame 900c and the right frame 900d, a left support ribs 935 and a right support rib 937 can be formed, respectively.

FIG. 3 is a diagram in X-Z coordinate plane. Z-axis is the thickness direction of the liquid crystal display panel LCDP. The display surface of the liquid crystal display panel LCDP is on the X-Y coordinate plane, for example, long side is disposed on the X-axis and short side is disposed on the Y-axis. For the liquid crystal display panel having the guide panel according to the present disclosure, the results of vibration endurance test at each direction (X, Y and Z direction) are shown in the following Table 1.

TABLE 1

| Vibration Force | X-axis | Y-axis | Z-axis |
| --- | --- | --- | --- |
| 1.5 Grms | OK | OK | OK |
| 2.0 Grms | OK | OK | OK |
| 2.5 Grms | OK | OK | OK |

As known from above table 1, when 2.5 Grms vibration force is applied at each direction (X, Y and Z-direction), the test results are pass. Considering that the LCD panel is decided as a good product when it has passed vibration tests with 1.5 Grms external vibration force in all directions, it is clear that the LCD panel according to the present disclosure has enhanced endurance against the external vibration forces.

Furthermore, the results of the impact endurance test at each direction (X, Y and Z-directions) are shown in the following Table 2.

TABLE 2

|  | Impact | Visual Damage | Functional Error |
|---|---|---|---|
| X-axis | 270.7 G | OK | OK |
| Y-axis | 309.0 G | OK | OK |
| Z-axis | 309.0 G | OK | OK |

As known from above table 2, when 270.7 G impact force is applied at X-direction, there is no deformation or damage visually and functionally. When 309.0 G impact force is applied at Y or Z-direction, there is no deformation or damage visually and functionally. Considering that the LCD panel is decided as a good product when it has passed the impact tests with 120 G external impact force in all directions, it is clear that the LCD panel according to the present disclosure has enhanced endurance against the external impact forces.

In the above preferred embodiment, mainly explained is the case for adapting an "F" shaped structure at the upper frame of the guide panel opposing to the lower frame where the LED light source is disposed. In addition, if it is required to ensure further strength, the "F" shaped structure is applied to the left and right frames of the guide panel.

While the embodiments of the present invention have been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A liquid crystal display device comprising:
    a guide panel including a body portion having 4 rim frames having a first width, a first, a second, a third and a fourth vertical surfaces extruded downward with a first length from outsides of the 4 rim frames, a first support rib, a second support rib and a third support rib apart from the first, and the second, and the third vertical surfaces, respectively extended downward with a second length except the fourth vertical surface, and a settle portion protruded inward from the 4 rim frames with a second width;
    a light emitting diode (LED) light source disposed at the fourth vertical surface;
    a liquid crystal display panel disposed on the settle portion of the guide panel; and
    a cover bottom including 4 vertical walls and a bottom surface perpendicular to the 4 vertical walls,
    wherein three vertical walls are inserted into spaces formed between the first, the second and the third support ribs and the first, the second and the third vertical surfaces.

2. The device according to claim 1, further comprising:
    a light guide plate, wherein the LED light source is disposed at one side of the light guide plate.

3. The device according to claim 1, further comprising:
    a reflection sheet between the cover bottom and the light guide plate; and
    an optical sheet between the light guide plate and the liquid crystal display panel.

4. The device according to claim 1, wherein the first length is corresponding to a height of the vertical walls of the cover bottom, and the second length is shorter than the first length.

* * * * *